US012578789B2

(12) United States Patent (10) Patent No.: US 12,578,789 B2

Wang et al. (45) Date of Patent: Mar. 17, 2026

(54) METHOD, APPARATUS, DEVICE, MEDIUM, AND PROGRAM PRODUCT FOR IMAGE PROCESSING

(71) Applicant: Beijing Zitiao Network Technology Co., Ltd., Beijing (CN)

(72) Inventors: Xiaosong Wang, Beijing (CN); Wei Fu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/658,524

(22) Filed: May 8, 2024

(65) Prior Publication Data

US 2024/0377885 A1 Nov. 14, 2024

(30) Foreign Application Priority Data

May 8, 2023 (CN) .......................... 202310513040.5

(51) Int. Cl.
 *G06F 3/01* (2006.01)
 *G06T 5/70* (2024.01)
 *G06T 5/73* (2024.01)

(52) U.S. Cl.
 CPC ................ *G06F 3/013* (2013.01); *G06T 5/70* (2024.01); *G06T 5/73* (2024.01)

(58) Field of Classification Search
 CPC .............. G06F 3/013; G06T 5/70; G06T 5/73
 USPC ........................................................ 345/156
 See application file for complete search history.

(56) References Cited

U.S. PATENT DOCUMENTS

| | | | | |
|---|---|---|---|---|
| 2008/0107356 A1* | 5/2008 | Matsumoto | .......... | H04N 7/0125 |
| | | | | 382/299 |
| 2010/0289961 A1* | 11/2010 | Chen | ...................... | H04N 5/142 |
| | | | | 348/E5.078 |
| 2014/0361971 A1* | 12/2014 | Sala | ........................ | G06F 3/013 |
| | | | | 345/156 |
| 2021/0287633 A1* | 9/2021 | Rai Kurlethimar | ...... | G09G 3/20 |

FOREIGN PATENT DOCUMENTS

| | | |
|---|---|---|
| CN | 105574817 A | 5/2016 |
| CN | 114092323 A | 2/2022 |
| CN | 115564644 A | 1/2023 |
| CN | 115619683 A | 1/2023 |

OTHER PUBLICATIONS

First report received from Chinese patent application No. 202310513040.5 mailed on Dec. 4, 2025, 2 pages.

* cited by examiner

*Primary Examiner* — Mark Edwards

(57) ABSTRACT

The present application provides an image processing method and apparatus, a device, a medium, and a program product, which performs image enhancement on at least one pixel point to be enhanced determined according to a gaze region to obtain and output an enhanced image. Therefore, image enhancement does not need to be performed on all pixel points in a target image. The image enhancement only needs to be performed on a gaze region of the target image, and the image enhancement is not performed on other regions, except the gaze region, of a display screen, so that the enhanced image may not affect the visual effect of the eyes, and the energy consumption in the image enhancement process is reduced.

20 Claims, 6 Drawing Sheets

In response to determining that a pixel point to be enhanced includes a target pixel sampling point, determine, in a display screen, at least one target pixel sampling point falling into a gaze region ⟶ 301

Oversample each target pixel sampling point in a target image to obtain a sampled pixel point value of each target pixel sampling point ⟶ 302

Integrate the sampled pixel point value of the at least one target pixel sampling point in the gaze region to obtain a sampled image of the gaze region, and output the sampled image as an enhanced image ⟶ 303

FIG. 3a

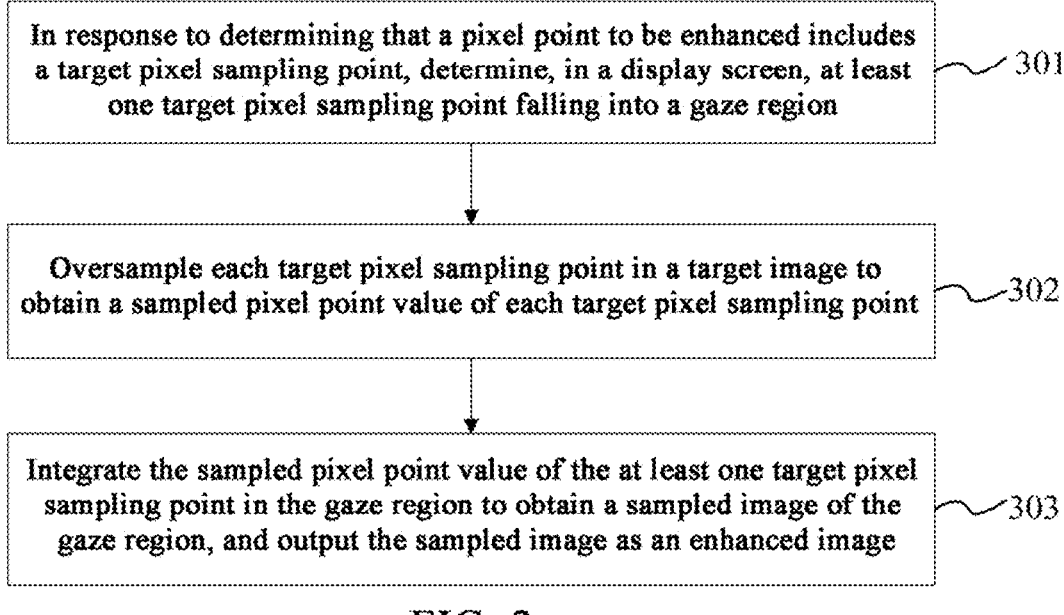

Target pixel sampling point

◈ Sub sampling point

◉ Center of target pixel sampling point

FIG. 3b

In response to determining that a pixel point to be enhanced includes a pixel point to be sharpened, determine a plurality of pixel points to be sharpened in a target image according to a gaze region ~~401

Sharpen the plurality of pixel points to be sharpened to obtain a sharpened image, and output the sharpened image as an enhanced image ~~402

FIG. 4

Determine a target neighborhood pixel point from at least one neighborhood pixel point corresponding to a target pixel point ~~501

Perform color enhancement on the target pixel point according to a target color difference between the target neighborhood pixel point and the target pixel point to obtain a color enhancement value, and calculate a new color value of the target pixel point according to the at least one color enhancement value, wherein at least one neighborhood pixel point correspondingly obtains at least one color enhancement value ~~502

FIG. 5

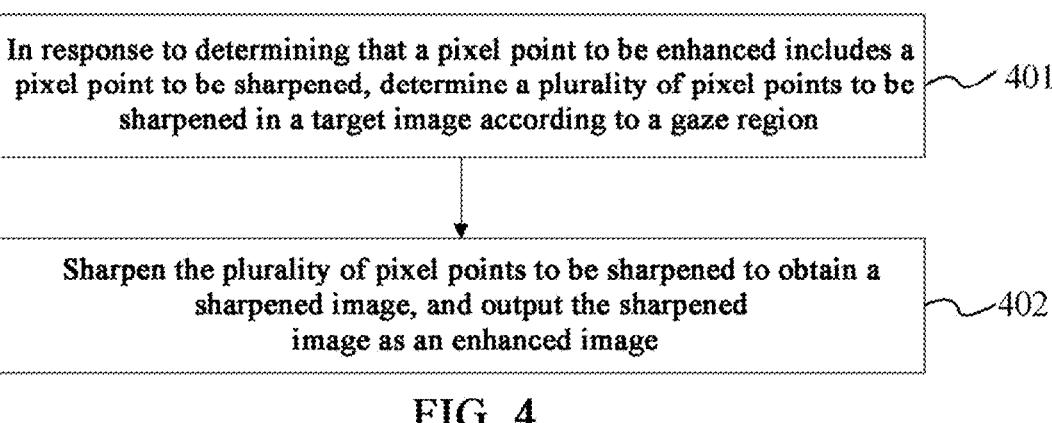

FIG. 6a

METHOD, APPARATUS, DEVICE, MEDIUM, AND PROGRAM PRODUCT FOR IMAGE PROCESSING

CROSS-REFERENCE TO RELATED APPLICATION(S)

This application claims priority to Chinese Application No. 202310513040.5 filed in May 8, 2023, the disclosures of which are incorporated herein by reference in their entities.

FIELD

The present application relates to the technical field of image processing, and in particular, to method, apparatus, device, medium, and program product for image processing.

BACKGROUND

In the related technology, in situations of blurred images, aliasing, and the like caused by poor image resolution, during image enhancement performed on a displayed target image, the image enhancement is generally performed on the entire image. However, performing the image enhancement on the entire image may lead to the problem of a significant increase in power consumption.

SUMMARY

In view of this, the present application aims to provide an image processing method and apparatus, a device, a medium, and a program product, so as to solve the problem of high power consumption in an image processing process.

Based on the above objective, a first aspect of the present application provides an image processing method:

obtaining a target image;

determining a gaze region of eyes in a display screen; and determining at least one pixel point to be enhanced according to the gaze region to perform image enhancement on the target image according to the pixel point to be enhanced to obtain and output an enhanced image; wherein the pixel point to be enhanced includes a target pixel sampling point and/or a pixel point to be sharpened.

Based on the same concept, a second aspect of the present application provides an image processing apparatus:

an image obtaining module, configured to obtain a target image;

a region determining module, configured to determining a gaze region of eyes in a display screen; and an image enhancement module, configured to determine at least one pixel point to be enhanced according to the gaze region to perform image enhancement on the target image according to the pixel point to be enhanced to obtain and output an enhanced image; wherein the pixel point to be enhanced includes a target pixel sampling point and/or a pixel point to be sharpened.

Based on the same concept, a third aspect of the present application provides an electronic device, including a memory, a processor, and a computer program stored in the memory and runnable on the processor. The processor, when running the program, implements the method according to the first aspect of the present application.

Based on the same concept, a fourth aspect of the present application provides a non-transient computer-readable storage medium, having computer instructions stored thereon.

The computer instructions are configured to causing a computer to perform the method according to the first aspect of the present application.

Based on the same concept, a fifth aspect of the present application provides a computer program product, including computer program instructions. The computer program instructions, when executed on a computer, cause the computer to perform the method according to the first aspect of the present application.

It can be seen from the above that the image processing method and apparatus, the device, the medium, and the program product provided by the present application can perform image enhancement on at least one pixel point to be enhanced determined according to a gaze region to obtain and output an enhanced image. Therefore, image enhancement does not need to be performed on all pixel points in a target image. The image enhancement only needs to be performed on a gaze region of the target image, and the image enhancement is not performed on other regions, except the gaze region, of a display screen, so that the enhanced image may not affect the visual effect of the eyes, and the energy consumption in the image enhancement process is reduced.

BRIEF DESCRIPTION OF THE DRAWINGS

To describe the technical solutions in the present application or in the related art more clearly, the following briefly introduces the accompanying drawings for describing the embodiments or the related art. Apparently, the accompanying drawings in the following description show merely the embodiments of the present application, and a person of ordinary skill in the art may still derive other drawings from the accompanying drawings without creative efforts.

FIG. 3a is a flowchart of an image sampling method for a gaze region according to an embodiment of the present application.

FIG. 3b is a schematic diagram of determining a sub sampling point according to an embodiment of the present application.

FIG. 4 is a flowchart of an image sharpening method for a gaze region according to an embodiment of the present application.

FIG. 5 is a flowchart of color enhancement calculation according to an embodiment of the present application.

FIG. 6a is a schematic diagram of a calculation formula of a nonlinear color enhancement value according to an embodiment of the present application.

DETAILED DESCRIPTION OF EMBODIMENTS

Figure 1:
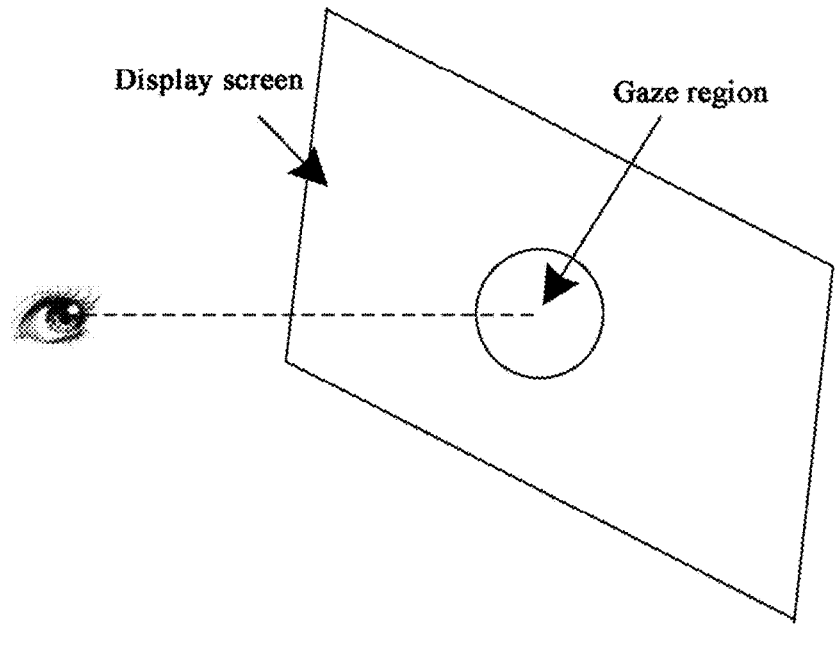
FIG. 1 is a schematic diagram of an application scenario of an image processing method according to an embodiment of the present application.

It can be understood that data involved in the technical solutions (including but not limited to the data itself, and obtaining or use of the data) should comply with the requirements of corresponding laws and regulations and relevant provisions.

The principle and spirit of the present application will be described below by referring to several exemplary implementations. It should be understood that provision of these implementations are only for making those skilled in the art better understand and implement the present application, instead of limiting the scope of the present application in any manner. Rather, these implementations are provided for understanding the present application more thoroughly and completely, and can completely transfer the scope of the present disclosure to those skilled in the art.

In this article, it should be understood that the number of any element in the figures is used for examples rather than limitations, and any naming is only for differentiation and does not have any restrictive meaning.

Based on the description of the background mentioned above, there are still the following situations in the related art:

Extended Reality (XR) means combining reality with virtuality through a computer to create a human-computer interaction virtual environment. This is also a collective term for various technologies such as Augmented Reality (AR), Virtual Reality (VR), and Mixed Reality (MR). XR may allow a user to interact with a virtual digital world, providing the user with a richer experience, for example, for a learning purpose, a gaming purpose, a content creation purpose, a social media and interaction purpose, and the like.

Generally speaking, VR (AR, or MR) image rendering uses a graphics rendering pipeline of Open Graphics Library (OpenGL). It mainly includes the following processes:

Firstly, a vertex shader is used to perform vertex shading on vertex data of an image. Then, shape (primitive) is performed on the image subjected to the vertex shading. After the assembling is completed, a geometric shader is used to perform geometric shading. Next, the image subjected to the geometric shading is rasterized to generate a fragment for use by a fragment shader. The fragment shader uses a color sampled from the fragment as a display color of a final pixel point. Finally, the fragment can be displayed on a display device after test and mixing processing.

Image enhancement may be achieved through image sharpening, oversampling, and other modes. The image sharpening is an image processing method that makes an edge of an image clearer. Since an acquired image may have poor contrast in an image acquisition process due to a blurred edge and blurred details, important features and details hidden in data need to be highlighted by image enhancement, thus making image information clearer. However, during sharpening in the related technology, it is generally necessary to enhance the color of a current pixel point by comparing a plurality of pixel points surrounding the current pixel point with the current pixel point. A sampling action may generate high power consumption, and a sharpening algorithm samples a plurality of additional pixel points every time when one-pixel point is enhanced, so sharpening the entire image will significantly increase the power consumption.

The problem of aliasing is because an electronic display device has a certain resolution, that is, the number of pixels is limited. Each pixel can only display one color. The resolution of an original image may be much higher than that of the display device. This causes that the pixels of the display device cannot be in one-to-one correspondence to the pixels of the original image. The current rendering technology may use a specific method to map primitives to pixels on a final screen. A graphics processing unit (GPU) rendering pipeline as an example. This operation is completed in a rasterization stage and generates a fragment for use by the fragment shader. The color sampled from the fragment by the fragment shader is used as the display color of the final pixel. If the resolution of the original image is higher than that of the display device, the fragment shader may only sample one point in the fragment, which may cause aliasing in the image.

In order to optimize the problem of aliasing, an oversampling algorithm is generally used in the related technology. This means that each pixel is no longer determined solely by the color of one sampling point, but by the colors of a plurality of sub sampling points. By acquiring the colors of the plurality of sub sampling points, the color of a displayed pixel is determined, thereby reducing the problem of image aliasing.

The problem of image blurring is because information of an image generally includes high-frequency information and low-frequency information. Generally, the energy of the image is mainly concentrated in a low-frequency part, and a frequency band where noise is located is mainly in a high-frequency part. Edge information of the image is also mainly concentrated in the high-frequency part. A fundamental reason for edge or detail blurring of an image is that the image is subjected to an averaging or integration operation (or other equivalent operations), resulting in a decrease in the frequency of the image. Meanwhile, from the perspective of the frequency domain, the essence of image blurring is precisely because its high-frequency component is attenuated.

To optimize the problem of image blurring, in the related technology, the entire image is sharpened during sharpening of image rendering. After the image is pixelated, the color of a current pixel point is enhanced by comparing a plurality of pixel points surrounding the current pixel point with the current pixel point. Each pixel point in the image may be used as the current pixel point. A sampling action may generate high power consumption, and a sharpening algorithm samples a plurality of additional pixel points every time when one-pixel point is enhanced, so sharpening the entire image will significantly increase the power consumption. However, during imaging of the eyes of a user, only an image at a focusing position of the eyes is the clearest, and the definitions from a center to an edge of a field of view gradually decrease. Therefore, sharpening the pixel points at the edge of the field of view cannot improve the visual perception of the user. Therefore, sharpening of an XR image does not need to achieve the effect of sharpening the entire image, but only needs to sharpen images at and near the focusing position of the eyes. Local sharpening may improve the user experience and can minimize over-rendering and reduce the time and power required by rendering of each frame.

Based on the above description, the following will make a detailed explanation to the principle and spirit of the present application by referring to the several representative implementations of the present application.

FIG. 1 is a schematic diagram of an application scenario of an image processing method according to an embodiment of the present application. The method is mainly applied to a terminal device. The terminal device includes but is not limited to a desktop computer, a mobile phone, a mobile computer, a tablet, a media player, a smart wearable device (such as an XR device), a personal digital assistant (PDA), or other electronic devices that can achieve corresponding functions.

The terminal device is configured to display a target image, and a specific display process includes: A target image is first obtained. As shown in FIG. 1, a gaze region of eyes in a display screen is determined. This can determine at least one pixel point to be enhanced according to the gaze region, and finally perform image enhancement on the target image according to the pixel point to be enhanced to obtain and output an enhanced image. The image enhancement is not performed on other regions, except the gaze region, of the display screen, so that the enhanced image may not affect the visual effect of the eyes, and the energy consumption in the sharpening process is reduced.

The image processing method according to an exemplary implementation of the present application will be described below in conjunction with the application scenario of FIG. 1. It should be noted that the above application scenario is only shown for the purpose of facilitating the understanding of the spirit and principle of the present application, and the implementation of the present application is not limited in this regard. On the contrary, the implementation of the present application can be applied to any applicable scenario.

Figure 2:
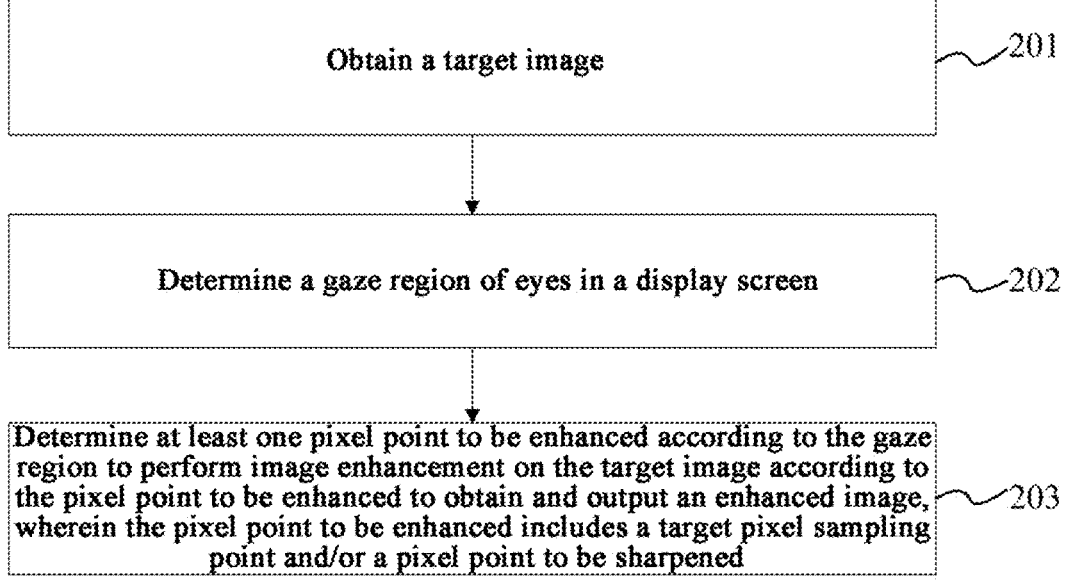
FIG. 2 is a flowchart of an image processing method according to an embodiment of the present application.

The embodiments of the present application provide an image processing method. The method is applied to a terminal device. As shown in FIG. 2, the method includes:

Step 201: A target image is obtained.

In a specific implementation, the target image is an image to be displayed in a display screen of the terminal device, and may be directly an image or any frame of image in a video.

Step 202: A gaze region of eyes in a display screen is determined.

In a specific implementation, the gaze region is smaller than a size of the display screen, and is triangular, rectangular, pentagonal, hexagonal, circular, elliptical, egg-shaped, or the like, or may be in another irregular shape. In this embodiment, the gaze region is preferably circular.

Step 203: At least one pixel point to be enhanced is determined according to the gaze region, and image enhancement is performed on the target image according to the pixel point to be enhanced to obtain and output an enhanced image, wherein the pixel point to be enhanced includes a target pixel sampling point and/or a pixel point to be sharpened.

In a specific implementation, pixel points of the target image displayed on the display screen are selected according to the gaze region, and pixel points of the target image falling into the gaze region are determined to be the pixel point to be enhanced. Selection criteria for determining that a pixel point falls into the gaze region is as follows: All pixel sampling points corresponding to the display screen fall into the gaze region, or all/part of pixel sampling points fall into the gaze region, or center points of pixel sampling points of the display screen fall into the gaze region. Preferably, the selection criteria in this embodiment is that the center points of the pixel sampling points of the display screen fall into the gaze region. Then, image enhancement is performed on the target image according to the pixel point to be enhanced, wherein the image enhancement includes sharpening a plurality of pixel points to be sharpened to obtain a sharpened image, and/or various sampled pixel values obtained by oversampling the gaze region are integrated according to a matrix arrangement mode corresponding to the target image, thus obtaining a sampled image of the gaze region and completing the oversampling process of the gaze region. Or, an ordinary processing scheme can be used, such as center point sampling, random sampling, or skip sampling, which will not be specifically limited.

Through the above scheme, image enhancement can be performed on at least one pixel point to be enhanced determined according to a gaze region to obtain and output an enhanced image. Therefore, image enhancement does not need to be performed on all pixel points in a target image. The image enhancement only needs to be performed on a gaze region of the target image, and the image enhancement is not performed on other regions, except the gaze region, of a display screen, so that the enhanced image may not affect the visual effect of the eyes, and the energy consumption in the image enhancement process is reduced.

In some embodiments, as shown in FIG. 3a, at least one pixel point to be enhanced is determined according to the gaze region, and image enhancement is performed on the target image according to the pixel point to be enhanced to obtain and output an enhanced image, which includes:

Step 301: In response to determining that the pixel point to be enhanced includes a target pixel sampling point, at least one target pixel sampling point falling into the gaze region is determined in the display screen.

In a specific implementation, if the pixel point to be enhanced includes the target pixel sampling point, the image enhancement needs to be performed using an oversampling method. Selection criteria for determining that a pixel point falls into the gaze region is as follows: All pixel sampling points corresponding to the display screen fall into the gaze region, or all/part of pixel sampling points fall into the gaze region, or center points of pixel sampling points of the display screen fall into the gaze region. Preferably, the selection criteria in this embodiment is that the center points of the pixel sampling points of the display screen fall into the gaze region.

Step 302: Each target pixel sampling point is oversampled in the target image to obtain a sampled pixel point value of each target pixel sampling point.

In a specific implementation, portions, corresponding to the various target pixel sampling point of the gaze region, in the target image are oversampled to acquire pixel values of the corresponding portions for further operation to obtain the sampled pixel values.

Step 303: The sampled pixel point value of the at least one target pixel sampling point in the gaze region is integrated to obtain a sampled image of the gaze region, and the sampled image is output as the enhanced image.

In a specific implementation, the various sampled pixel values obtained by oversampling the gaze region are integrated according to a matrix arrangement mode corresponding to the target image, thus obtaining the sampled image of the gaze region and completing the oversampling process of the gaze region.

For other regions, except the gaze region, of the display screen, an ordinary sampling scheme is used, such as center point sampling, random sampling, or skip sampling. Sampled images from other regions are stitched and fused with the sampled image of the aforementioned gaze region to form a complete image for being displayed on the display screen.

Through the above scheme, it is possible to oversample pixels, corresponding to the gaze region, in the target image according to the gaze region of the eyes in the display screen, and the at least one sampled pixel value obtained by the oversampling of the gaze region is integrated for displaying. In this way, it is not necessary to oversample the entire image. The ordinary sampling mode can be used for a non-gaze region of the target image. This reduces the regional range for oversampling. This effectively relieves the aliasing corresponding to the gaze region of the eyes and effectively reduces the power consumption of image sampling.

In some embodiments, as shown in FIG. 4, at least one pixel point to be enhanced is determined according to the gaze region, and image enhancement is performed on the target image according to the pixel point to be enhanced to obtain and output an enhanced image, which includes:

Step 401: In response to determining that the pixel point to be enhanced includes a pixel point to be sharpened, a plurality of pixel points to be sharpened are determined in the target image according to the gaze region.

In a specific implementation, if the pixel point to be enhanced includes the pixel point to be sharpened, the image enhancement needs to be performed using an image sharpening method. At this time, pixel points of the target image displayed on the display screen are selected according to the gaze region, and pixel points of the target image falling into the gaze region are determined to be the pixel point to be sharpened.

Step 402: The plurality of pixel points to be sharpened are sharpened to obtain a sharpened image, and the sharpened image is output as the enhanced image.

In a specific implementation, each of the plurality of pixel points to be sharpened is used as the target pixel, and the color of a target pixel point is enhanced by sampling at least one neighborhood pixel point around the target pixel point and comparing it with the target pixel point to obtain a new color value of the target pixel point. When color enhancement on each pixel point among the plurality of pixel points to be sharpened is completed, the new color values corresponding to the plurality of pixel points to be sharpened are integrated to obtain and output the sharpened image, thus completing the sharpening process of the gaze region of the target image.

Regions other than the gaze region on the display screen may not be processed, or may be correspondingly processed according to a need of a user. This will not be limited here.

Through the above scheme, it is possible to sharpen the plurality of pixel points to be sharpened, corresponding to the gaze region, in the target image according to the gaze region of the eyes in the display screen, and the plurality of pixel points to be sharpened after sharpening are integrated to obtain and output the sharpened image. Therefore, all the pixel points in the target image do not need to be sharpened, and only the gaze region of the target image needs to be sharpened. Regions other than the gaze region of the display screen will not be processed, so that the sharpened image may not affect the visual effect of the eyes, and the energy consumption in the sharpening process is reduced.

In some implementations, step 202 includes:

Step 2021: The eyes are focused and located through an eye tracking mode, a focus point of the eyes in the display screen is determined, and the gaze region of the eyes is determined according to the focus point.

Alternatively, step 2022: A center point of the display screen is used as a focus point of the eyes, and the gaze region of the eyes is determined according to the focus point.

In a specific implementation, if an eye tracking module is arranged on the terminal device, the eye tracking module may be used to focus and locate the eyes through the eye tracking mode, so that the focus point of the eyes in the display screen is determined, and the gaze region of the eyes is then determined according to the focus point. The focus point is a center position of the gaze region. This may adjust the gaze region as the eyes move, and then adjust a region selected by the corresponding pixel point to be sharpened, so that a to-be-sharpened region is always within the gaze region of the eyes, thus ensuring the viewing effect of a user on the target image and also reducing the size of the sharpened region, and thereby reducing the number of sampled pixel points and effectively reducing the power consumption.

If no eye tracking module is arranged on the terminal device, to determine the gaze region and ensure the effect of local sharpening, the center point of the display screen is selected as the focus point of the eyes, and the gaze region of the eyes is determined. The focus point is the center position of the gaze region.

For example, a coordinate system (using an x-axis as a horizontal axis and a y-axis as a longitudinal axis) centered on the center point of the display screen is established; coordinates, denoted as (p, q), of a current focus point of the eyes are obtained by using the function of the eye tracking module for eye tracking and locating; and if the current device does not have an eye tracking module, the focus point is (p, q)=(0, 0).

Through the above scheme, the position of the gaze region may be accurately determined based on the focus point, and the target image may be locally sharpened based on the gaze region.

In some embodiments, the gaze region is a circular region centered on the focus point and having a radius of r, where the radius r is less than or equal to half of a short edge length of the display screen. This can guarantee that the circular gaze region is within the display screen.

Step 203 includes:

Step 2031: In response to determining that the pixel point to be enhanced includes a pixel point to be sharpened, a coordinate value of each pixel point in the target image is obtained, and a square D of a distance between the coordinate value of each pixel point and the focus point is calculated.

In a specific implementation, when it is determined that the pixel point to be enhanced includes the pixel point to be sharpened, the square D of the distance between a coordinate value (m, n) of each pixel point of the target image in the display screen and the focus point is calculated. A specific calculation formula for D based on the determined focus point (p, q) is: $D=(p-m)^2+(q-n)^2$. If the determined focus point is (0,0), there will be $D=m^2+n^2$.

Step 2032: In response to the square D of the distance being less than or equal to the square of the radius r, a corresponding pixel point is determined to be a pixel point to be enhanced, and the plurality of pixel points to be enhanced falling into the gaze region are obtained.

In a specific implementation, for the coordinate value (m, n) of any pixel point in the target image, if the calculated square D of the distance is less than or equal to the square of the radius r, the pixel point with the coordinate value (m, n) is determined to be a pixel point to be sharpened; all the pixel points of the target image are filtered according to the above mode, so as to select all the pixel point to be sharpened; and a region, corresponding to these pixel point to be sharpened, in the target image is sharpened.

In addition, the square root of the square D of the distance may alternatively be directly compared with the radius r. If it is less than the radius r, the pixel point may be determined to be a pixel point to be sharpened.

Through the above scheme, as a circular region is more in line with the visual characteristic of the eyes and a distance can be directly determined based on the square of the distance to the focus point, a plurality of pixel points to be sharpened covered by the circular region can be determined, so that the plurality of determined pixel points to be sharpened are more in line with the visual demand of the eyes.

In some embodiments, determining the radius r of the circular region includes:

A first distance between the display screen and the eyes is obtained, and the radius r is calculated by using a first positive correlation function according to the first distance.

In a specific implementation, as a longer distance between the eyes and the display screen indicates a larger range of the gaze region, the corresponding radius r is calculated according to the first distance d between the display screen and the eyes and using the positive correlation function, for example, r=αd, where α is a coefficient, and α∈ a value greater than 0.

Through the above scheme, the corresponding gaze region can be adjusted according to the distance between the display screen and the eyes, so that the determined gaze region is more accurate. The local sharpening based on the gaze region for displaying is more in line with a viewing need of a user.

In some embodiments, step 203 further includes:

Step 2031': In response to determining that the pixel point to be enhanced includes a target pixel sampling point, a coordinate value of each pixel sampling point in the display screen is obtained, and a square D of a distance between the coordinate value of each pixel sampling point and the focus point is calculated.

In specific implementation, during the determination that the pixel point to be enhanced includes the target pixel sampling point, the coordinate value of each pixel sampling point in the display screen is used as a target coordinate value (u, v), and the square D of the distance between the target coordinate value and the focus point is calculated. A specific calculation formula for D based on the determined focus point (x, y) is: $D=(x-u)^2+(y-v)^2$. If the determined focus point is (0, 0), there will be $D=u^2+v^2$.

Step 2032': In response to the square D of the distance being less than or equal to the square of the radius r, a pixel sampling point corresponding to the square D of the distance is determined to be target pixel sampling point, and the at least one target pixel sampling point falling into the gaze region is obtained.

In a specific implementation, if the square D of the distance calculated based on the target coordinate value (u, v) is less than or equal to the square of the radius r, and the target coordinate value (u, v) is determined to be the target pixel sampling point, a region, corresponding to the target coordinate value (u, v), in the target image is oversampled.

In addition, the square root of the square D of the distance may alternatively be directly compared with the radius r. If it is less than the radius r, the pixel sampling point may be determined to be a target pixel sampling point.

Through the above scheme, as a circular region is more in line with the visual characteristic of the eyes and a distance can be directly determined based on the square of the distance to the focus point, target pixel sampling points covered by the circular region can be determined, so that the determined target pixel sampling points are more in line with the visual demand of the eyes.

In some embodiments, determining the radius r of the circular region includes:

A first distance between the display screen and the eyes is obtained, and the radius r is calculated by using a first positive correlation function according to the first distance.

In a specific implementation, as a longer distance between the eyes and the display screen indicates a larger range of the gaze region, the corresponding radius r is calculated according to the first distance d between the display screen and the eyes and using the positive correlation function, for example, r=αd, where α is a coefficient, and α∈ a value greater than 0.

Through the above scheme, the corresponding gaze region can be adjusted according to the distance between the display screen and the eyes, so that the determined gaze region is more accurate. The oversampling based on the gaze region for displaying is more in line with a viewing need of a user.

In some implementations, step 302 includes:

Step 3021: At least two sub sampling points are respectively matched for each target pixel sampling point from the target image.

Step 3022: A pixel point value corresponding to each sub sampling point is acquired from the target image.

Step 3023: For each target pixel sampling point, arithmetic processing is performed on the pixel point values of the at least two sub sampling points corresponding to the target pixel sampling point to obtain the sampled pixel point value of the target pixel sampling point.

In a specific implementation, at least two sub sampling points may be determined for each target pixel sampling point. In this way, after the arithmetic processing is performed on the pixel values acquired from the target image based on the two sub sampling points, the sampled pixel value of the corresponding target pixel sampling point is obtained, so that the sampled pixel value can be combined with pixel colors of the various sub sampling points, and the aliasing situation of the sampled image of the gaze region obtained after the sampled pixel values of the various target pixel sampling points is effectively reduced.

In some embodiments, the number of sub sampling points corresponding to a target pixel sampling point is 2, 3, 4, 5, 6, or 8. In this embodiment, four sub sampling points are preferred.

In some embodiments, at step 3021, for each target pixel sampling point, an execution process includes:

Step 30211: Partial derivative arithmetic processing is performed on coordinates of the target pixel sampling point, and a coordinate change rate of the target pixel sampling point is calculated.

In specific implementation, glsl (an OpenGL shading language) provides a function dFdx ( ) or dFdy ( ) to calculating a partial derivative. If a difference in u or v between two target pixel sampling points is significant, a calculated partial derivative will also be significant, indicating that the two target pixel sampling points are in positive correlation. Based on this situation, if the coordinate value of the target pixel sampling point is (u, v), where an x-coordinate is u and a y-coordinate is v, after the partial derivative arithmetic processing, the coordinate change rate of u in an x-coordinate direction is dx, and the coordinate change rate of v in a y-coordinate direction is dy.

Step 30212: A second distance is determined by using a second positive correlation function according to the coordinate change rate.

The second distance is a distance between the sub sampling points and a center of the target pixel sampling point in the x-coordinate or y-coordinate direction.

Step 30213: At a pixel point position, corresponding to the target pixel sampling point, in the target image, at least two sub sampling points having the second distance from a center of the target pixel sampling point are matched.

In a specific implementation, the center of the target pixel sampling point is used as a center, and the at least two sub sampling points having the second distance from the center are determined. When the number of the corresponding sub sampling points is preferably four, four sub sampling points at the upper left part, the upper right part, the lower left part, and the lower right part of the center are selected (as shown in FIG. 3*b*).

Through the above scheme, the positions of the sub sampling points can be more accurately determined, and the sampled pixel values calculated based on the determined sub sampling points also more accurately reflect pixel colors of the target image at the positions, thereby further improving the oversampling effect on the gaze region.

In some embodiments, in step 30213, a second distance is determined by using a second positive correlation function according to the coordinate change rate, which includes:

The partial derivative is multiplied by a predetermined coefficient to obtain the second distance.

In a specific implementation, the corresponding predetermined coefficient is preferably ¼, and the second distance between the sub sampling points and the center of the target pixel sampling point is sqrt (dx*dx+dy*dy), where dx or dy may be ¼ of a difference between two adjacent u or v values.

Through the above scheme, the positions of the sub sampling points determined based on the above calculated second distance is more accurate, so that the pixel values acquired by the sub sampling points can more accurately reflect an actual display requirement corresponding to the target image.

In some implementations, step 3023 includes:

For each target pixel sampling point, an average value of the pixel values of the at least two subs sampling points corresponding to the target pixel sampling point is calculated, and the sampled pixel point value of the target pixel sampling point is determined according to the average value.

In specific implementation, in order to ensure that the determined sampled pixel value may accurately reflect the color of each sub sampling point, it is preferred to use an arithmetic processing mode for calculating the average value. In addition, a value obtained after multiplying the calculated average value by a corresponding coefficient can be used as the sampled pixel value of the target pixel sampling point.

In some implementations, step 402 includes:

Step 4021: Each of the plurality of pixel points to be sharpened is used as a target pixel point, and at least one neighborhood pixel point corresponding to the target pixel point is determined from the plurality of pixel points to be sharpened.

In a specific implementation, in the sharpening process, the color value of the target pixel point should be further decreased when the color value of the target pixel point in the center of the neighborhood is less than the average color value of other neighborhood pixel points in the neighborhood where the target pixel point is located, and the color value of the pixel point in the center should be further increased when the color value of the target pixel point in the center of the neighborhood is greater than the average color value of other neighborhood pixel points in the neighborhood where the target pixel point is located. Therefore, in the sharpening process of the pixel point to be sharpened, the target pixel point that needs to be subjected to color enhancement needs to be determined first. The target pixel point may be any one of the plurality of pixel points to be sharpened. Generally, eight pixel points in one circle surrounding the target pixel point are used as neighborhood pixel points, but 24 pixel points in two circles surrounding the target pixel point may be used as neighborhood pixel points as needed. Since the target pixel point has different positions, the number of the neighborhood pixel points also varies. However, each target pixel point has at least one neighborhood pixel points. Determining the target pixel point and the neighborhood pixel point points is beneficial for subsequent color enhancement on the target pixel point. Other algorithms may also be selected to perform the color enhancement on the pixel point to be sharpened. No specific limitation will be limited here.

Step 4022: Color enhancement is performed on the target pixel point according to a color difference between the target pixel point and the at least one neighborhood pixel point to obtain a new color value of the target pixel point.

In a specific implementation, after the neighborhood pixel points and the target pixel point are determined, the color value of the target pixel point and the color value of each neighborhood pixel point need to be respectively determined, and then a difference between the color value of each neighborhood pixel point and the color value of the target pixel point is then calculated as the color difference. Exemplarily, a Laplace algorithm is taken as an example. According to the color difference, the Laplace algorithm can be used to calculate the color enhancement between all the neighborhood pixel points and the target pixel point, achieving color enhancement on the target pixel point to obtain the new color value of the target pixel point. Then, the Laplace algorithm may be used to perform color enhancement on different target pixel points in sequence to achieve color enhancement on the plurality of pixel points to be sharpened.

Step 4023: In response to completion of the color enhancement on all the pixel points to be sharpened, the new color values corresponding to the plurality of pixel points to be sharpened are integrated to obtain and output the sharpened image.

In specific implementation, after all the pixel point to be sharpened have been subjected to color enhancement, the new color values corresponding to the plurality of pixel points to be sharpened are integrated based on original positional relationships between the plurality of pixel points to be sharpened to obtain and output the sharpened image, thus completing the sharpening of the target image based on the gaze region.

In some embodiments, at least one neighborhood pixel point corresponding to the target pixel point is determined from the plurality of pixel points to be sharpened, which includes:

Step 40211: A pixel point selection range is determined, and at least one-pixel point, falling into the pixel point selection range, among the plurality of pixel points to be sharpened is determined to be the neighborhood pixel point by using the target pixel point as a center. Alternatively, Step 40212: A selection direction of the neighborhood pixel point relative to the target pixel point and a selection number corresponding to each selection direction are determined, and the selection number of pixel points corresponding to the selection direction are selected to be the neighborhood pixel point according to the selection direction by using the target pixel point as a center.

In specific implementation, for step 30211, the pixel point selection range needs to be determined in advance. Exemplarily, by using the target pixel point as a center, a pixel point distance i is determined. Exemplarily, i=1 indicates that the eight pixel points in one circle around the target pixel point are used as the neighborhood pixel points, and i=2 indicates that the 24 pixel points in two circles around the target pixel point are used as neighborhood pixel points. When only pixel points in up, down, left, and right directions of the target pixel point are used as the neighborhood pixel points, the color values of pixel points at remaining positions except the four directions may be set to the color value of the target pixel point, so that the color difference is 0, and color enhancement performed on the target pixel point by the corresponding neighborhood pixel points is automatically excluded.

In specific implementation, for step 30212, the selection direction generally includes the up, down, left, and right directions of the target pixel point, and the selection number is generally 1. By determining the selection direction and the selection number, only the selection number of pixel points in the up, down, left, and right directions of the target pixel point can be selected as the neighborhood pixel points.

In some embodiments, as shown in FIG. 5, color enhancement is performed on the target pixel point according to a color difference between the target pixel point and the at least one neighborhood pixel point to obtain a new color value of the target pixel point, which includes:

Step 501: A target neighborhood pixel point is determined from the at least one neighborhood pixel point corresponding to the target pixel point.

In a specific implementation, after the at least one neighborhood pixel point corresponding to the target pixel point is determined, the neighborhood pixel point on the right side of the target pixel point can be used as a starting point, and the neighborhood pixel points can be selected clockwise to determine the target neighborhood pixel point. Or, the order of determining the target neighborhood pixel point may be preset. If conditions permit, a color enhancement value on the target pixel point by each neighborhood pixel point may be calculated simultaneously, that is, all the neighborhood pixel points corresponding to the target pixel point may be determined to be the target neighborhood pixel points simultaneously. If the calculations on the neighborhood pixel points are carried out simultaneously, the color enhancement values of all the neighborhood pixel points may be obtained simultaneously. This can improve the calculation efficiency.

Step 502: Color enhancement is performed on the target pixel point according to a target color difference between the target neighborhood pixel point and the target pixel point to obtain a color enhancement value, and the new color value of the target pixel point is calculated according to the at least one color enhancement value, wherein at least one neighborhood pixel point correspondingly obtains at least one color enhancement value.

In a specific implementation, at least one of a Laplace operator and a nonlinear Laplace operator may be selected for color enhancement calculation to obtain the new color value for the target pixel point.

In some embodiments, if the nonlinear Laplace operator is selected, step 502 includes:

Step 5021: The color enhancement value of the target neighborhood pixel point on the target pixel point is calculated according to a preset enhancement threshold and a noise reduction parameter by using a nonlinear color enhancement value calculation formula.

In a specific implementation, as shown in FIG. 6a, the nonlinear color enhancement value calculation formula may be:

$$\begin{cases} V(u) = a * \sin(u * b) & (|u| < \pi/b) \\ V(u) = 0 & (|u| \ge \pi/b) \end{cases}$$

Figure 6B:
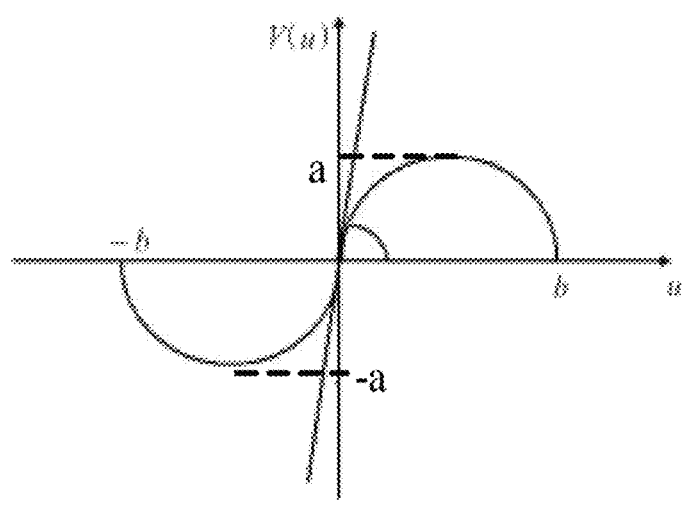
FIG. 6b is a schematic diagram of another calculation formula of a nonlinear color enhancement value according to an embodiment of the present application.

Or, as shown in FIG. 6b, the nonlinear color enhancement value calculation formula may be:

$$V(u) \begin{cases} \dfrac{b}{2}\tan(90° - a) - \sqrt{\dfrac{b^2}{4\cos^2(90° - a)} - \left(u + \dfrac{b}{2}\right)^2}, & -b \le u \le 0 \\ -\dfrac{b}{2}\tan(90° - a) + \sqrt{\dfrac{b^2}{4\cos^2(90° - a)} - \left(u + \dfrac{b}{2}\right)^2}, & 0 < u \le b \\ 0, & \text{Others} \end{cases}$$

Figure 6C:
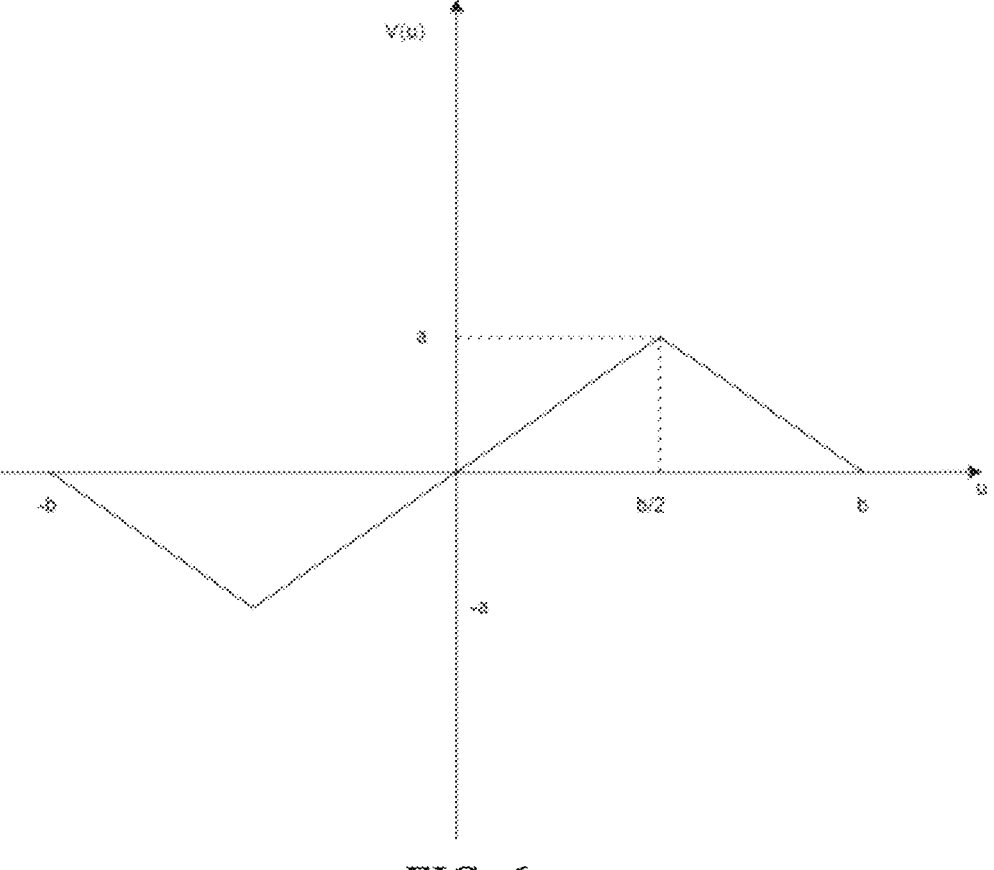
FIG. 6c is a schematic diagram of still another calculation formula of a nonlinear color enhancement value according to an embodiment of the present application.

Or, as shown in FIG. 6c, the nonlinear color enhancement value calculation formula may be:

$$\begin{cases} V(u) = \dfrac{2a}{b} * u & (|u| \le b/2) \\ V(u) = \dfrac{2a}{|u|} * u - \dfrac{2a}{b} * u & (|u| > b/2) \end{cases}$$

Wherein a is the enhancement threshold; b is the noise reduction parameter; V(u) is the color enhancement value of a target neighborhood pixel point on the target pixel point; and u represents the color difference between any target neighborhood pixel point and the target pixel point.

It can be seen that neither of the above three color enhancement value calculation formulas is a linear calculation formula. The characteristic of nonlinear color enhancement of the nonlinear Laplace operator is mainly achieved relaying on the nonlinear color enhancement value calculation formula, and the reduction of the noise impact on the sharpening process is also achieved by adjusting parameters of the nonlinear color enhancement value calculation formula. The sinusoidal nonlinear color enhancement value calculation formula shown in FIG. 6a is taken as an example, which may be determined by adjusting the noise reduction parameter b. The noise reduction parameter b may affect an effective range of the color difference. When the color difference is positive, if the color difference u is greater than or equal to π/b, the calculated color enhancement value is 0, i.e. V(u)=0, indicating that the color enhancement using the nonlinear color enhancement value calculation formula has no enhancement effect at this time. That is, when the color difference is greater than or equal to π/b, no enhancement is performed. If the range corresponding to the noise exceeds π/b, it avoids enhancement on some noises. When the color difference is negative, if the color difference u is less than or equal to −π/b, the calculated color enhancement value is 0, i.e. V(u)=0, indicating that the color enhancement using the nonlinear color enhancement value calculation formula has no enhancement effect at this time. That is, when the color difference value is less than or equal to −π/b, no enhancement is performed. If the range corresponding to the noise is less than $-\pi/b$, it avoids enhancement on some noises. By dividing the effective range of the color difference, the noise and the color value are separately processed, thus avoiding enhancement on some noises. Furthermore, when the color difference between the target pixel point and the neighborhood pixel point is large ($|u|\geq\pi/b$), distortion caused by an extremely large color enhancement value calculated by an enhancement portion can be avoided (when the calculated color enhancement value is too large, the transition is very abrupt due to the large color value difference between the target pixel point and the neighborhood pixel point. This easily causes distortion). The noise within the range ($-\pi/b$, $\pi/b$) may be limited by increasing threshold a, so that an enhancement value of this part of noise can be increased by a times at most. Meanwhile, the color enhancement value is limited to avoid the distortion caused by the extremely large color enhancement value. Thus, the noise and edge details are separately processed finally, so that sharpening of an edge of an image is enhanced, and the sensitivity to noise is reduced. This can improve the sharpening effect.

A calculation formula for color difference u is:

$$u = f(x, y) - f(m, n).$$

Wherein $m\in[x-i, x+i]$, $n\in[y-i, y+i]$; i is a pixel point distance; $f(m, n)$ represents the color value of the target neighborhood pixel point with the coordinate $(m, n)$; $f(x, y)$ represents the color value of the target pixel point; $(x, y)$ is the coordinate value corresponding to the target pixel point. When $x\neq m$ and $y\neq n$, $(m, n)$ is the coordinate value corresponding to the target neighborhood pixel point.

In the calculation process, due to $m\in[x-i, x+i]$ and $n=[y-i, y+i]$, in case of $i=1$, the color differences between the eight neighborhood pixel points and the target pixel point is calculated, thereby calculating the color enhancement values of the eight neighborhood pixel points on the target pixel point. It should be noted that when $x=m$, $y=n$, the color difference of the target pixel point and itself is calculated. At this time, the color difference is 0, and the color enhancement value obtained by using the nonlinear color enhancement value calculation formula is also 0. This automatically eliminates the influence of the target pixel point on itself when the nonlinear Laplace operator is used for color enhancement, so that the color enhancement result is more accurate, and the sharpening effect is better.

Step 5022: The new color value of the target pixel point is calculated through a nonlinear Laplace operator according to the at least one color enhancement value.

In specific implementation, the formula of the nonlinear Laplace operator is:

$$g(x, y) = f(x, y) + \Sigma_{m=x-i}^{x+i}\Sigma_{n=y-i}^{y+i}V(u),$$

wherein $g(x, y)$ is the new color value, and $f(x, y)$ is the color value of the target pixel point.

Exemplarily, when the color difference between a target neighborhood pixel point and the target pixel point is $u_1$, the color enhancement value of the target neighborhood pixel point on the target pixel point is $V(u_1)$. Then, the color enhancement values of other neighborhood pixel points on the target pixel point are determined in sequence, or the enhancement values of the eight neighborhood pixel points on the target pixel point are calculated simultaneously, and a sum of the enhancement values of all the neighborhood pixel points on the target pixel point is calculated to obtain a total enhancement value $\Sigma_{m=x-i}^{x+i}\Sigma_{n=y-i}^{y+i}V(u)$. Next, a sum of the total enhancement value and the color value $f(x, y)$ of the target pixel point before enhancement is calculated to obtain the new color value $g(x, y)=f(x, y)+\Sigma_{m=x-i}^{x+i}\Sigma_{n=y-i}^{y+i}V(u)$ after color enhancement. When all the pixel point to be sharpened are used as the target pixel points for color enhancement, the output sharpened image is obtained through integration.

In some embodiments, if the linear Laplace operator is selected, step 502 includes:

Step 5021': The color enhancement value of the target neighborhood pixel point on the target pixel point is calculated according to a preset linear parameter by using a linear color enhancement value calculation formula.

Step 5022: The new color value of the target pixel point is calculated through a linear Laplace operator according to the at least one color enhancement value.

Using the linear Laplacian operator to sharpen the image is related to the degree of abrupt change from the neighborhood pixel points surrounding the target pixel point to the target pixel point in the image, which means that the sharpening is in accordance with the degree of change of the pixel points of the image. A first-order differential of a functional image describes where the functional image changes, that is, whether the functional image rises or falls. A second-order differential describes a rate of change of the functional image, that is, whether the functional image is in a sharp rise/fall or a gentle rise/fall. Therefore, a degree of transition of the color of the image between the pixel points may be found according to the second-order differential. For example, the transition from white to black is sharp. The linear Laplace operator is the basis of differential calculation of the color values of the pixel points in an image neighborhood. It is an image neighborhood enhancement algorithm derived through the second-order differential. The basic idea of the linear Laplace operator is that when the color value of the target pixel point is less than the average color value of other neighborhood pixel points in the neighborhood where the target pixel point is located, the color value of the target pixel point should be further decreased; and when the color value of the target pixel point is greater than the average color value of other neighborhood pixel points in the domain where the target pixel point is located, the color value of the target pixel point should be further increased, so as to sharpen the image. In the implementation process of the linear Laplace algorithm, gradients are calculated in four or eight directions of the target pixel point, and the gradients are summated to determine a relationship between the color value of a center pixel point and the color values of other pixel points in the neighborhood. The color values of the pixel points are adjusted by using a gradient calculation result.

In a specific implementation, the linear Laplace operator is a second-order derivative operator. For a continuous function $f(i, j)$, its Laplace value (second-order derivative) at the coordinate position $(i, j)$ of the target pixel point is defined as follows:

$$\nabla^2 f = \frac{\partial^2 f}{\partial x^2} + \frac{\partial^2 f}{\partial y^2}$$

For the target image, the linear Laplace operator may be simplified as:

$$\nabla^2 f = 4f(i,\,j) - f(i-1,\,j) - f(i,\,j-1) - f(i+1,\,j) - f(i,\,j+1)$$

wherein for a target neighborhood pixel point (i−1, j), the color enhancement value of the target neighborhood pixel point (i−1, j) on the target pixel point (i, j) is f (i, j)−f (i−1, j); f (i, j) is the color value of the target pixel point; f (i−1, j), f (i, j−1), f (i+1, j), f (i, j+1) are the color values of different neighborhood pixel points; and a matrix template for the linear Laplace operator is obtained:

$$H_1 = \begin{bmatrix} 0 & -1 & 0 \\ -1 & 4 & -1 \\ 0 & -1 & 0 \end{bmatrix}$$

The above linear Laplace operator is a four-neighborhood operator, which only considers the influence of the neighborhood pixel points in the four directions of the target pixel point in the center on the target pixel point.

If the color enhancement of neighborhood pixel points at a total of eight positions including four corner positions and four direction positions on the target pixel point needs to be considered, a matrix template of eight neighborhood operators below may be used:

$$H_2 = \begin{bmatrix} -1 & -1 & -1 \\ -1 & 8 & -1 \\ -1 & -1 & -1 \end{bmatrix}$$

An eight-neighborhood calculation formula is:

$$\nabla^2 f = 8f(i,\,j) - f(i-1,\,j) - f(i,\,j-1) - f(i+1,\,j) - f(i,\,j+1) -$$
$$f(i-1,\,j-1) - f(i+1,\,j+1) - f(i+1,\,j-1) - f(i-1,\,j+1)\circ$$

From the above two kinds of Laplacian templates, it can be seen that if there is a white dot in a black plane, a template matrix can make the white dot brighter. Each digit in an eight-neighborhood operator matrix and a four-neighborhood operator matrix is a parameter. The parameter is multiplied by the color value of the pixel point corresponding to the position to obtain a product, and the products are summed, thereby achieving color enhancement of the neighborhood pixel points on the target pixel point once. The new color value g (i, j) of the target pixel point is output.

$$g(i,\,j) = \begin{cases} f(i,\,j) - \nabla^2 f, & \nabla^2 f \le 0 \\ f(i,\,j) + \nabla^2 f, & \nabla^2 f > 0 \end{cases}$$

When the linear Laplacian operator is used for color enhancement, due to the linear calculation between each target neighborhood pixel point and the target pixel point, a few of calculation resources are occupied, the calculation speed is higher, and the sharpening efficiency is higher.

In some embodiments, before a plurality of pixel points to be sharpened in the target image are determined according to the gaze region, the target image is pixelated.

In a specific implementation, the target image is decomposed into a plurality of geometric primitives, and the geometric primitives are transformed into pixel points, which includes:

Integral grilles occupied by the geometric primitives are determined in a screen space window, and a color value of each integral grille is determined. Pixel point sampling is performed on the display screen to obtain the screen space window.

In this embodiment, the pixel point sampling needs to be first performed on the display screen to obtain the screen space window. Pixel point sampling is performed on the display screen to obtain the screen space window, which includes:

A resolution of the display screen is determined, and the number of first pixel points in a lengthwise direction of a display region of the display screen and the number of second pixel points in a width direction of the display region are determined according to the resolution.

The display region is divided according to the number of the first pixel points and the number of the second pixel points to obtain the screen space window that includes a plurality of integral grilles.

After the screen space window is determined, the integral grilles occupied by the geometric primitives need to be determined in the screen space window, and the color value of each integral grille is determined. Integral grilles occupied by the geometric primitives are determined in a screen space window, which includes:

A bounding box is determined according to vertices of the geometric primitives in the screen space window, wherein the bounding box includes a plurality of integral grilles;

coverage judgment is performed on each integral grille in the bounding box; and all integral grilles subjected to the coverage judgment are determined to be the integral grilles occupied by the geometric primitives.

Figure 7:
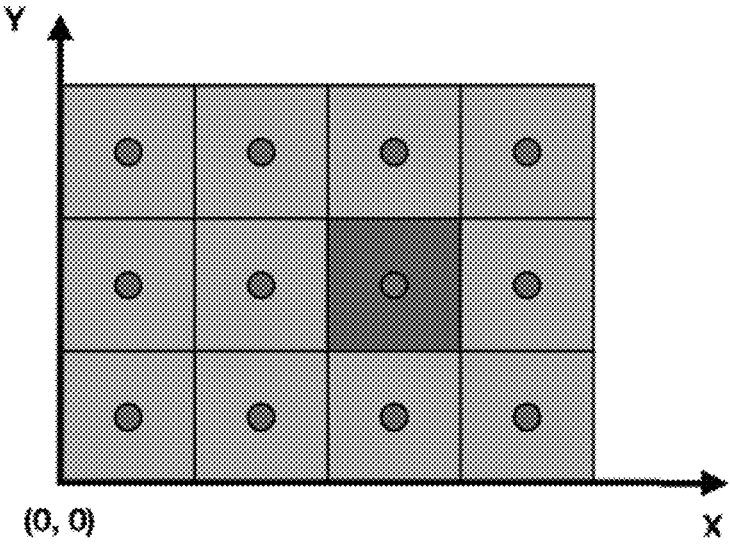
FIG. 7 is a schematic diagram of a screen space according to an embodiment of the present application.
Figure 8:
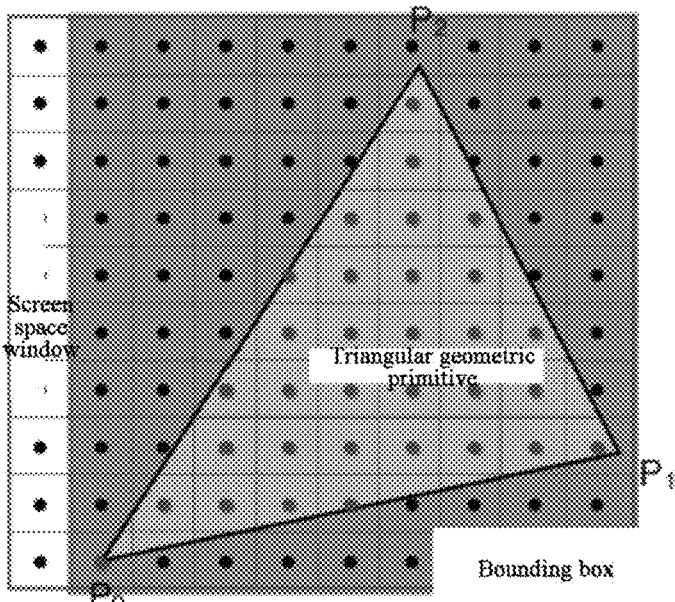
FIG. 8 is a schematic diagram of determining integral grilles occupied by a geometric primitive according to an embodiment of the present application.

In a specific implementation, exemplarily, as shown in FIG. 7, each grid in the figure represents an integral grille. For a screen with a resolution of width×height, the number width of first pixel points in a lengthwise direction of a display region of the display screen and the number height of second pixel points in a width direction of the display region are determined according to the resolution; the display region is divided according to the number of the first pixel points and the number of the second pixel points, so that the display region of the screen is divided into width×height integral grilles of 1×1. Each integral grille can be used for pixel point filling, so that a screen space range is (0, 0) to (width, height); and if an index coordinate (p, q) of a pixel point is integral, it also represents an index coordinate of a pixel point corresponding to the integral grille. The index range is from (0,0) to (width−1, height−1), and a center of an integral grille is taken as a coordinate position of the integral grille, that is, if the coordinate of the integral grille is (p+0.5, q+0.5), it also represents a pixel point coordinate of a pixel point corresponding to the integral grille. The coordinate of the dark-colored integral grille in FIG. 7 is (2.5, 1.5), but the integral grille can be found by searching (2,1). The screen space window can be formed by selecting a certain number of integral grilles within the screen space range. Generally, the screen space window is a rectangular window composed of a plurality of continuous integral grilles.

In a specific implementation, exemplarily, a triangular geometric primitive is taken as an example, as shown in FIG.

8. The light-colored portion of the triangle represents an area occupied by the geometric primitive, and the dark-colored portion represents a bounding box. Three vertexes of the triangular geometric primitive are determined to be $P_0$, $P_1$, and $P_2$. According to $P_0$, $P_1$, and $P_2$, a size of the bounding box of the triangular geometric primitive may be determined. For a triangular geometric primitive, if the coverage judgment is performed on all the integral grilles (determining whether the integral grilles are inside or outside the triangular geometric primitive), there will be many unnecessary performance overheads. An optimization mode used in the embodiments of the present application is to use a bounding box to reduce the range of coverage judgment. Firstly, the bounding box of the triangular geometric primitive in x and y directions in the screen space window is calculated, thereby determining a range of traversing the integral grilles; and whether pixel points are inside the triangular geometric primitive is then determined. A cross multiplication method can be used to perform the coverage judgment. After it is determined that the three vertexes of the triangular geometric primitive are $P_0$, $P_1$, and $P_2$, whether a center point Q of any integral grille is located in the triangular geometric primitive is determined by cross multiplication one by one. Cross products $\overrightarrow{P_0P_1} \times \overrightarrow{P_0Q}$, $\overrightarrow{P_1P_2} \times \overrightarrow{P_1Q}$, and $\overrightarrow{P_2P_0} \times \overrightarrow{P_2Q}$ are calculated at one time. If three obtained vectors are in, the same direction, it indicates that point Q is located in the triangular geometric primitive, and otherwise, point Q is located outside the triangular geometric primitive. The coverage judgment can also be performed using a barycentric coordinate system method. Firstly, a coordinate $(\alpha, \beta, \gamma)$ of the center point Q in a barycentric coordinate system of the triangular geometric primitive is determined. If three components of the coordinate $(\alpha, \beta, \gamma)$ are all greater than zero, it indicates that the center point Q is located in the triangle. If the center point Q of the integral grille is located in the triangular geometric primitive, it indicates that the integral grille is occupied by the triangular geometric primitive. If the center point Q of the integral grille is located outside the triangular geometric primitive, it indicates that the integral grille is not occupied by the triangular geometric primitive. Then, according to the color of the geometric primitive, the color value allocated to each integral grille is determined step by step for subsequent color enhancement calculation.

Then, the color values of all the integral grilles are integrated to obtain two-dimensional pixel points.

In this step, after the determination on all the occupied integral grilles is completed and the color values are allocated, the two-dimensional pixel points of the triangular geometric primitive are obtained by integrating these integral grilles, thus completing the pixelization of the geometric primitive. When all the geometric primitives corresponding to the target image have been transformed, a pixel point graph of the target image is completed, which provides conditions for the subsequent color enhancement.

It should be noted that the method of the embodiments of the present application may be executed by a single device, such as a computer or a server. Or, the method of this embodiment may be applied in a distributed scenario and is completed by a plurality of devices that cooperate with each other. In this distributed scenario, one of the plurality of devices may only execute one or more steps in the method of the embodiments of the present application, and the plurality of devices may interact with each other to complete the method.

It should be noted that some embodiments of the present application have been described above. Other embodiments fall within the scope of the attached claims. In some cases, the actions or steps recorded in the claims may be executed in an order different from that in the aforementioned embodiments and can still achieve the desired results. In addition, the process depicted in the accompanying drawings does not necessarily require a specific order or continuous orders to achieve the desired results. In some implementations, multitasking and parallel processing are also possible or may be advantageous.

Based on the same inventive concept, corresponding to the method in any embodiment described above, the present application further provides an image processing apparatus.

Figure 9:
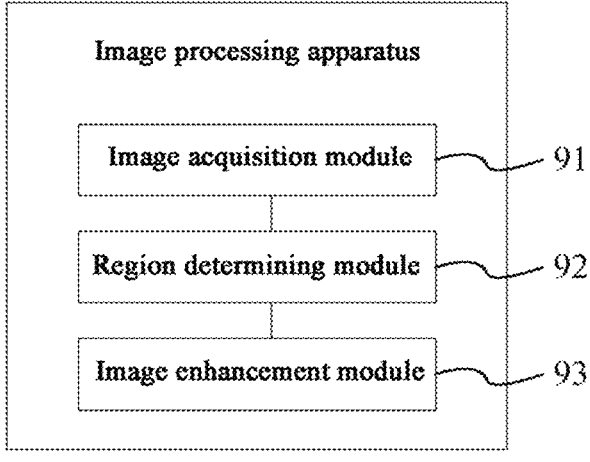
FIG. 9 is a schematic structural diagram of an image processing apparatus according to an embodiment of the present application.

Referring to FIG. 9, the image processing apparatus includes:

an image obtaining module 91, configured to obtain a target image;

a region determining module 92, configured to determine a gaze region of eyes in a display screen; and an image enhancement module 93, configured to determine at least one pixel point to be enhanced according to the gaze region to perform image enhancement on the target image according to the pixel point to be enhanced to obtain and output an enhanced image, wherein the pixel point to be enhanced includes a target pixel sampling point and/or a pixel point to be sharpened.

For ease of description, during description, the above apparatus is divided into various modules for description according to its functions. Of course, during the implementation of the present application, the functions of the various modules can be implemented in the same or multiple software and/or hardware.

The apparatus of the above embodiments is configured to perform the corresponding image processing method in any embodiment described above, and has the beneficial effects of the corresponding method embodiments, which will not be elaborated here.

Based on the same inventive concept, corresponding to the method of any embodiment described above, the present application further provides an electronic device, including a memory, a processor, and a computer program stored in the memory and runnable on the processor. The processor, when running the program, implements the image processing method according to any embodiment described above.

Figure 10:
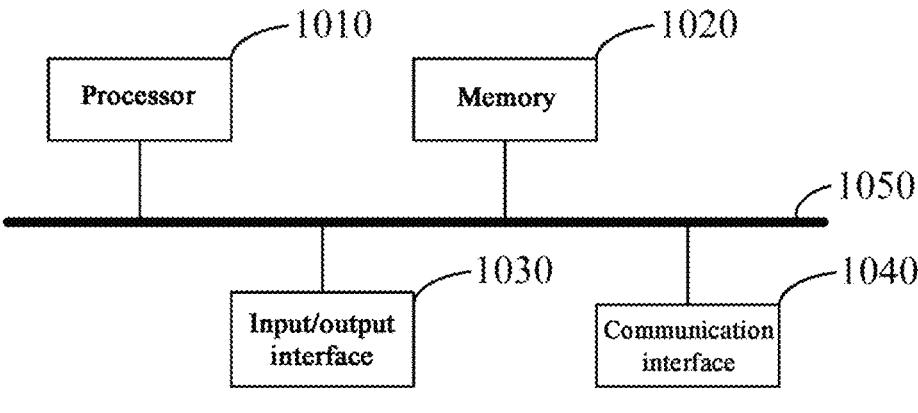
FIG. 10 is a schematic structural diagram of an electronic device according to an embodiment of the present application.

FIG. 10 shows a schematic structural diagram of hardware of a more specific electronic device according to this embodiment. The device may include: a processor 1010, a memory 1020, an input/output interface 1030, a communication interface 1040, and a bus 1050. The processor 1010, the memory 1020, the input/output interface 1030, and the communication interface 1040 are communicatively connected to each other in the device through the bus 1050.

The processor 1010 may be implemented using a general-purpose Central Processing Unit (CPU), a microprocessor, an Application Specific Integrated Circuit (ASIC), one or more integrated circuits, or the like, so as to run related programs to implement the technical solutions provided in the embodiments of this specification.

The memory 1020 may be implemented in the form of a Read Only Memory (ROM), a Random Access Memory (RAM), a static storage device, a dynamic storage device, and the like. The memory 1020 may store an operating system and other application programs. When the technical solutions provided in the embodiments of this specifically are implemented through software or firmware, relevant program codes are stored in the memory 1020 and called and executed by the processor 1010.

The input/output interface 1030 is configured to be connected to an input/output module for information inputting and outputting. The input/output/module may be configured as a component in the device (not shown in the figure), or may be externally connected to the device to provide corresponding functions. The input devices may include a keyboard, a mouse, a touch screen, a microphone, various sensors, and the like, and the output device may include a display, a speaker, a vibrator, an indicator lamp, and the like.

The communication interface 1040 is configured to be connected to a communication module (not shown in the figure) to achieve communication interaction between this device and other devices. The communication module may achieve communication through a wired mode (such as a USB and a network cable), or a wireless mode (such as a mobile network, a WIFI, and Bluetooth).

The bus 1050 includes a channel for transmitting information between the various components of the device (such as the processor 1010, the memory 1020, the input/output interface 1030, and the communication interface 1040).

It should be noted that although the above device only shows the processor 1010, the memory 1020, the input/output interface 1030, the communication interface 1040, and the bus 1050, in the specific implementation process, the device may further include other components necessary for normal operation. In addition, those skilled in the art can understand that the above device may only include the components necessary to implement the solutions of the embodiments of this specification, and may not necessarily include all the components shown in the figure.

The electronic device of the above embodiments is configured to perform the corresponding image processing method in any embodiment described above, and has the beneficial effects of the corresponding method embodiments, which will not be elaborated here.

Based on the same inventive concept, corresponding to the method of any embodiment described above, the present application further provides a non-transient computer-readable storage medium, having computer instructions stored thereon. The computer instructions are configured to cause a computer to perform the image processing method as described in any one of the above embodiments.

The computer-readable medium of this embodiment includes non-volatile, volatile, movable, and unmovable media that can store information by using any method or technology. The information can be computer-readable instructions, data structures, program modules, or other data. Examples of computer storage media include, but not limited to, a Phase-change Random Access Memory (PRAM), a Static Random Access Memory (SRAM), a Dynamic Random Access Memory (DRAM), other types of RAMs, an ROM, an Electrically Erasable Programmable Read-Only Memory (EEPROM), a flash memory or other internal memory technologies, a CD-ROM, a Digital Video Disk (DVD) or other optical memories, a magnetic cartridge type magnetic tape, a magnetic tape/disk storage device or other magnetic storage devices or any other non-transmitting media, and may be used for storing information that may be accessed by the computing device.

The computer instructions stored in the storage medium of the above embodiment are configured to cause the computer to perform the image processing method as described in any one of the above embodiments, and have the beneficial effects of the corresponding method embodiments, which will not be elaborated here.

Based on the same concept, corresponding to the method of any embodiment described above, the present application further provides a computer program product, including computer program instructions. The computer program instructions, when run on a computer, cause the computer to perform the method as described in any one of the above embodiments, and have the beneficial effects of the corresponding method embodiments, which will not be elaborated here.

A person of ordinary skill in the art should understand that the discussion of any of the above embodiments is only illustrative and not intended to imply that the scope (including the claims) of the present application is limited to these examples. Under the ideas of the present application, the technical features of the above embodiments or different embodiments can also be combined, the steps can be achieved in any order, and there are many other changes in different aspects of the above embodiments of the present application, which are not provided in the details for simplicity.

In addition, to simplify the explanation and discussion, and to avoid making the embodiments of the present application difficult to understand, well-known power/ground connections with integrated circuit (IC) chips and other components may or may not be shown in the provided accompanying drawings. In addition, the apparatus may be shown in the form of a block diagram to avoid making the embodiments of the present application difficult to understand. Furthermore, this also takes into account the following fact that the details of the implementation of the apparatus of these block diagrams are highly dependent on a platform on which the embodiments of the present application are to be implemented (namely, these details should be fully within the understanding scope of those skilled in the art). When specific details (such as circuits) have been elaborated to describe exemplary embodiments of the present application, it is evident to those skilled in the art that the embodiments of the present application can be implemented without these specific details or with changes in these specific details. Therefore, these descriptions should be considered being explanatory rather than being restrictive.

Although the present application has been described in conjunction with the specific embodiments of the present application, many substitutions, modifications, and transformations of these embodiments will be apparent to those of ordinary skill in the art. For example, other memory architectures (such as a Dynamic RAM (DRAM)) can use the discussed embodiments.

The embodiments of the present application aim to cover all such substitutions, modifications, and transformations falling within the broad scope of the attached claims. Therefore, any omission, modification, equivalent substitution, and improvement made within the spirit and principle of the embodiments of the present application shall fall within the protection scope of the present application.

We claim:

1. An image processing method, comprising:
obtaining a target image;
determining a gaze region of eyes in a display screen, wherein determining the gaze region of the eyes in the display screen comprises using a center point of the display screen as a focus point of the eyes to determine the gaze region of the eyes according to the focus point;
determining at least one pixel point to be enhanced according to the gaze region, to perform image enhancement on the target image according to the pixel point to be enhanced to obtain and output an enhanced image; wherein the pixel point to be enhanced comprises a target pixel sampling point and/or a pixel point to be sharpened; and oversampling each target pixel sampling point from the target image to obtain a sampled pixel point value of each target pixel sampling point, further comprising:

matching at least two sub sampling points for each target pixel sampling point from the target image respectively comprising:

performing a process for each target pixel sampling point comprising:

performing partial derivative arithmetic processing on coordinates of the target pixel sampling point to calculate a coordinate change rate of the target pixel sampling point.

2. The method of claim 1, wherein determining at least one pixel point to be enhanced according to the gaze region, to perform image enhancement on the target image according to the pixel point to be enhanced to obtain and output the enhanced image comprises:

in response to determining that the pixel point to be enhanced comprises a target pixel sampling point, determining, in the display screen, at least one target pixel sampling point falling into the gaze region; and integrating the sampled pixel point value of the at least one target pixel sampling point in the gaze region to obtain a sampled image of the gaze region, and to output the sampled image as the enhanced image.

3. The method of claim 1, wherein determining at least one pixel point to be enhanced according to the gaze region, to perform image enhancement on the target image according to the pixel point to be enhanced to obtain and output the enhanced image comprises:

in response to determining that the pixel point to be enhanced comprises a pixel point to be sharpened, determining a plurality of pixel points to be sharpened in the target image according to the gaze region; and sharpening the plurality of pixel points to be sharpened to obtain a sharpened image, to output the sharpened image as the enhanced image.

4. The method of claim 1, wherein determining the gaze region of the eyes in the display screen further comprises:

focusing and locating the eyes through an eye tracking mode to determine a focus point of the eyes in the display screen, to determine the gaze region of the eyes according to the focus point.

5. The method of claim 4, wherein the gaze region is a circular region with the focus point as a circle center and with a radius r, wherein the radius r is less than or equal to half of a short edge of the display screen; and determining at least one pixel point to be enhanced according to the gaze region comprises:

in response to determining that the pixel point to be enhanced comprises a target pixel sampling point, obtaining a coordinate value of each pixel sampling point in the display screen to calculate a square D of a distance between the coordinate value of each pixel sampling point and the focus point; and in response to the square D of the distance being less than or equal to a square of the radius r, determining a pixel sampling point corresponding to the square D of the distance to be the pixel point to be enhanced to obtain the at least one pixel point to be enhanced falling into the gaze region; or, in response to determining that the pixel point to be enhanced comprises a pixel point to be sharpened, obtaining a coordinate value of each pixel point in the target image to calculate a square D of a distance between the coordinate value of each pixel point and the focus point; and in response to the square D of the distance being less than or equal to the square of the radius r, determining a corresponding pixel point to be the pixel point to be sharpened to obtain the at least one pixel point to be enhanced falling into the gaze region.

6. The method of claim 5, wherein determining the radius r of the circular region comprises:

obtaining a first distance between the display screen and the eyes to calculate the radius r by using a first positive correlation function according to the first distance.

7. The method of claim 2, wherein oversampling each target pixel sampling point from the target image to obtain the sampled pixel point value of each target pixel sampling point comprises:

acquiring a pixel point value corresponding to each sub sampling point in the target image; and for each target pixel sampling point, performing arithmetic processing on the pixel point values of the at least two sub sampling points corresponding to the target pixel sampling point to obtain the sampled pixel point value of the target pixel sampling point.

8. The method of claim 7, wherein performing a process for each target pixel sampling point further comprising:

determining a second distance by using a second positive correlation function according to the coordinate change rate; and at a pixel point position corresponding to the target pixel sampling point, in the target image, matching at least two sub sampling points having the second distance from a center of the target pixel sampling point.

9. The method of claim 8, wherein determining the second distance by using the second positive correlation function according to the coordinate change rate comprises:

multiplying the coordinate change rate by a predetermined coefficient to obtain the second distance.

10. The method of claim 7, wherein for each target pixel sampling point, performing arithmetic processing on the pixel point values of the at least two sub sampling points corresponding to the target pixel sampling point to obtain the sampled pixel point value of the target pixel sampling point comprises:

for each target pixel sampling point, calculating an average value of the pixel point values of the at least two sub sampling points corresponding to the target pixel sampling point, to determine the sampled pixel point value of the target pixel sampling point according to the average value.

11. The method of claim 3, wherein sharpening the plurality of pixel points to be sharpened to obtain the sharpened image comprises:

using each of the plurality of pixel points to be sharpened as a target pixel point, to determine at least one neighborhood pixel point corresponding to the target pixel point from the plurality of pixel points to be sharpened;

performing color enhancement on the target pixel point according to a color difference between the target pixel point and the at least one neighborhood pixel point to obtain a new color value of the target pixel point; and in response to completion of the color enhancement on all of the plurality of pixel points to be sharpened, integrating the new color values corresponding to the plurality of pixel points to be sharpened to obtain the sharpened image.

12. The method of claim 11, wherein determining at least one neighborhood pixel point corresponding to the target pixel point from the plurality of pixel points to be sharpened comprises:

determining a pixel point selection range, to determine, by using the target pixel point as a center, at least one-pixel point falling into the pixel point selection range among the plurality of pixel points to be sharpened to be the neighborhood pixel point; or, determining a selection direction of the neighborhood pixel point relative to the target pixel point and a selection number corresponding to each selection direction, to select, according to the selection direction by using the target pixel point as a center, the selection number of pixel points corresponding to the selection direction to be the neighborhood pixel point.

13. The method of claim 11, wherein performing color enhancement on the target pixel point according to a color difference between the target pixel point and the at least one neighborhood pixel point to obtain the new color value of the target pixel point comprises:

determining a target neighborhood pixel point from the at least one neighborhood pixel point corresponding to the target pixel point; and performing color enhancement on the target pixel point according to a target color difference between the target neighborhood pixel point and the target pixel point to obtain one color enhancement value, to calculate the new color value of the target pixel point according to at least one color enhancement value, wherein for the at least one neighborhood pixel point, the at least one color enhancement value is obtained correspondingly.

14. The method of claim 13, wherein performing color enhancement on the target pixel point according to the target color difference between the target neighborhood pixel point and the target pixel point to obtain one color enhancement value, to calculate the new color value of the target pixel point according to the at least one color enhancement value comprises:

calculating the color enhancement value of the target neighborhood pixel point on the target pixel point according to a preset enhancement threshold and a noise reduction parameter by using a nonlinear color enhancement value calculation formula; and calculating the new color value of the target pixel point through a nonlinear Laplace operator according to the at least one color enhancement value.

15. The method of claim 13, wherein performing color enhancement on the target pixel point according to the target color difference between the target neighborhood pixel point and the target pixel point to obtain one color enhancement value, to calculate the new color value of the target pixel point according to the at least one color enhancement value comprises:

calculating the color enhancement value of the target neighborhood pixel point on the target pixel point according to a preset linear parameter by using a linear color enhancement value calculation formula; and calculating the new color value of the target pixel point through a linear Laplace operator according to the at least one color enhancement value.

16. An electronic device, comprising a memory, a processor, and a computer program stored in the memory and executable on the processor, wherein the processor executes the program to implement the method, comprising:

obtaining a target image;

determining a gaze region of eyes in a display screen, wherein determining the gaze region of the eyes in the display screen comprises using a center point of the display screen as a focus point of the eyes to determine the gaze region of the eyes according to the focus point;

determining at least one pixel point to be enhanced according to the gaze region, to perform image enhancement on the target image according to the pixel point to be enhanced to obtain and output an enhanced image; wherein the pixel point to be enhanced comprises a target pixel sampling point and/or a pixel point to be sharpened; and oversampling each target pixel sampling point from the target image to obtain a sampled pixel point value of each target pixel sampling point, further comprising:

matching at least two sub sampling points for each target pixel sampling point from the target image respectively comprising:

performing a process for each target pixel sampling point comprising:

performing partial derivative arithmetic processing on coordinates of the target pixel sampling point to calculate a coordinate change rate of the target pixel sampling point.

17. The electronic device of claim 16, wherein determining at least one pixel point to be enhanced according to the gaze region, to perform image enhancement on the target image according to the pixel point to be enhanced to obtain and output the enhanced image comprises:

in response to determining that the pixel point to be enhanced comprises a target pixel sampling point, determining, in the display screen, at least one target pixel sampling point falling into the gaze region; and integrating the sampled pixel point value of the at least one target pixel sampling point in the gaze region to obtain a sampled image of the gaze region, and to output the sampled image as the enhanced image.

18. The electronic device of claim 16, wherein determining at least one pixel point to be enhanced according to the gaze region, to perform image enhancement on the target image according to the pixel point to be enhanced to obtain and output the enhanced image comprises:

in response to determining that the pixel point to be enhanced comprises a pixel point to be sharpened, determining a plurality of pixel points to be sharpened in the target image according to the gaze region; and sharpening the plurality of pixel points to be sharpened to obtain a sharpened image, to output the sharpened image as the enhanced image.

19. The electronic device of claim 16, wherein determining the gaze region of the eyes in the display screen further comprises:

focusing and locating the eyes through an eye tracking mode to determine a focus point of the eyes in the display screen, to determine the gaze region of the eyes according to the focus point.

20. A non-transient computer-readable storage medium, having computer instructions stored therein, wherein the computer instructions are used for causing a computer to perform the method, comprising:

obtaining a target image;

determining a gaze region of eyes in a display screen, wherein determining the gaze region of the eyes in the display screen comprises using a center point of the display screen as a focus point of the eyes to determine the gaze region of the eyes according to the focus point;

determining at least one pixel point to be enhanced according to the gaze region, to perform image enhancement on the target image according to the pixel point to be enhanced to obtain and output an enhanced image; wherein the pixel point to be enhanced comprises a target pixel sampling point and/or a pixel point to be sharpened; and oversampling each target pixel sampling point from the target image to obtain a sampled pixel point value of each target pixel sampling point, further comprising:

matching at least two sub sampling points for each target pixel sampling point from the target image respectively comprising:

performing a process for each target pixel sampling point comprising:

performing partial derivative arithmetic processing on coordinates of the target pixel sampling point to calculate a coordinate change rate of the target pixel sampling point.

* * * * *